United States Patent
McCusker et al.

(10) Patent No.: US 7,580,776 B1
(45) Date of Patent: Aug. 25, 2009

(54) INTEGRATED SEPARATION ASSURANCE METHOD FOR AN AIRCRAFT

(75) Inventors: Patrick D. McCusker, Center Point, IA (US); Eric N. Anderson, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 1125 days.

(21) Appl. No.: 10/629,286

(22) Filed: Jul. 29, 2003

(51) Int. Cl.
*G01C 23/00* (2006.01)

(52) U.S. Cl. ............. 701/3; 701/8; 701/9; 701/10; 701/14; 701/301

(58) Field of Classification Search ............. 701/3, 701/14, 8, 9, 10, 301
See application file for complete search history.

(56) References Cited

U.S. PATENT DOCUMENTS

| | | | |
|---|---|---|---|
| 6,085,147 A * | 7/2000 | Myers | 701/209 |
| 6,173,159 B1 * | 1/2001 | Wright et al. | 455/66.1 |
| 6,401,038 B2 * | 6/2002 | Gia | 701/301 |
| 6,480,120 B1 * | 11/2002 | Meunier | 340/970 |
| 6,577,947 B1 | 6/2003 | Kronfeld et al. | 701/202 |
| 2004/0024500 A1 * | 2/2004 | Campbell | 701/14 |
| 2004/0059472 A1 * | 3/2004 | Hedrick | 701/3 |
| 2004/0068372 A1 * | 4/2004 | Ybarra et al. | 701/301 |
| 2004/0111192 A1 * | 6/2004 | Naimer et al. | 701/9 |
| 2004/0143393 A1 * | 7/2004 | Knecht et al. | 701/301 |
| 2004/0181318 A1 * | 9/2004 | Redmond et al. | 701/9 |
| 2004/0183695 A1 * | 9/2004 | Ruokangas et al. | 340/945 |
| 2004/0254728 A1 * | 12/2004 | Poropat | 701/301 |

* cited by examiner

*Primary Examiner*—Khoi Tran

(57) ABSTRACT

A method and system for assuring separation between an aircraft and potential flight hazards is provided. According to the method, an intended path of the aircraft is predicted. A potential hazard to the aircraft along the intended path is identified. A distance from the potential hazard that the aircraft is required to maintain is determined. An ability of the aircraft to maneuver to avoid the identified hazard and to remain further from the identified hazard than the distance is determined. A probability that the aircraft will not maintain the distance from the identified hazards is determined. A pilot of the aircraft is alerted if the probability is greater than a predetermined level.

1 Claim, 3 Drawing Sheets

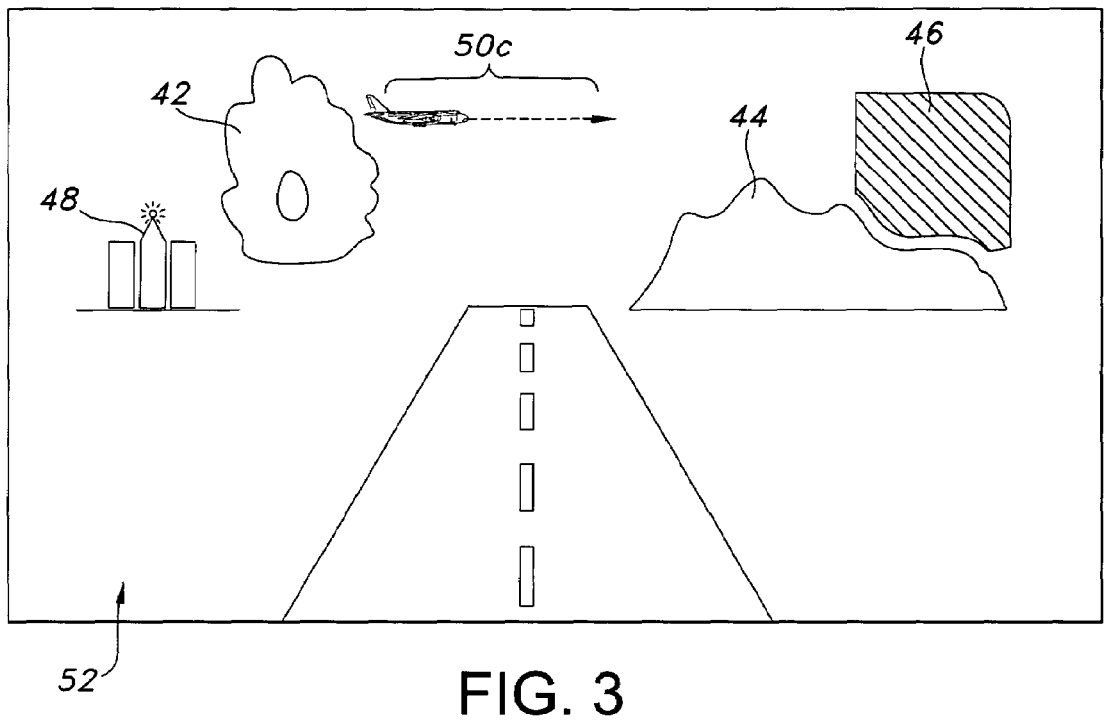
FIG. 3
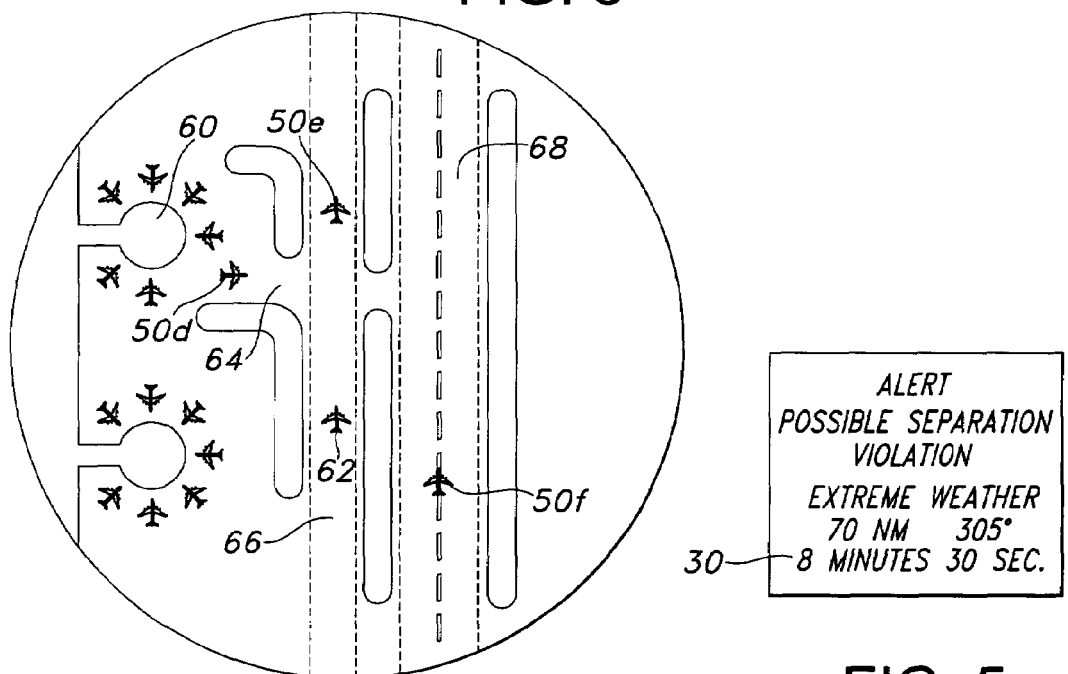
FIG. 4
FIG. 5

INTEGRATED SEPARATION ASSURANCE METHOD FOR AN AIRCRAFT

FIELD OF THE INVENTION

The invention relates to avionics, and more particularly, to a system and method for notifying an aircraft pilot of potential flight hazards.

BACKGROUND OF THE INVENTION

When operating an aircraft, great care must be taken to avoid hazards that would jeopardize the safety of the aircraft. To ensure safe aircraft operation, various agencies have established separation requirements, which are predetermined distances an aircraft must maintain from given hazards. The current method of maintaining separation between an aircraft and potential hazards is twofold. First, the flight crew is expected to perform a "see and avoid" function where the crew members maintain awareness of the aircraft situation by looking out of the aircraft windows and then taking appropriate action to avoid hazards. Secondly, a set of warning systems is installed on the aircraft, such as ground proximity warning systems (GPWS), traffic collision and avoidance systems (TCAS), and weather radar (WXR) to provide a caution or warning when it appears that the aircraft is in close proximity to a hazard.

There are three significant issues with the current separation model. First, the current model does not extend well to low-visibility conditions when the flight crew cannot maintain adequate situational awareness by looking out the windows. Second, the airborne warning systems typically do not provide a caution or warning until a potential accident is imminent. An imminent warning leaves little time for the flight crew to respond. In addition, the cautions and warnings of the current model are based upon explicit algorithms which are defined by industry committees. The algorithms may not be capable of handling or processing all flight conditions. Third, the airborne warning systems do not act in a coordinated fashion. The terrain warning system has no knowledge of weather or traffic; the traffic warning system has no knowledge of weather or terrain; and the weather warning system has no knowledge of terrain or traffic.

It is therefore an object of the invention to provide a hazard warning system that combines or integrates information from multiple warning systems.

It is a further object of the invention to provide a hazard warning system that reduces or eliminates false warnings.

It is another object of the invention to provide a hazard warning system that provides sufficient time for a pilot or flight crew to adjust the path of an aircraft.

A feature of the invention is an integrated hazard warning system that accepts inputs from a plurality of sources and determines a possibility of a hazardous situation based at least in part on the aircraft's ability to avoid the hazardous situation.

An advantage of the invention is that an advisory is communicated to the pilot or flight crew with sufficient time to avoid the hazardous situation.

SUMMARY OF THE INVENTION

The invention provides a method of assuring separation between an aircraft and potential flight hazards. According to the method, an intended path of the aircraft is predicted. A potential hazard to the aircraft along the intended path is identified. A distance from the potential hazard that the aircraft is required to maintain is determined. An ability of the aircraft to maneuver to avoid the identified hazard and to remain further from the identified hazard than the distance is determined. A probability that the aircraft will not maintain the distance from the identified hazards is determined. A pilot of the aircraft is alerted if the probability is greater than a predetermined level.

The invention also provides a method of assuring separation between an aircraft and potential flight hazards. According to the method, an intended path of the aircraft is predicted. Information relative to terrain proximal the aircraft is accessed. Inputs representative of weather events proximal the aircraft are received. Inputs representative of locations of nearby aircraft are received. Separation information is accessed that provides a distance by which the aircraft must be separated from any of the terrain, weather events, and nearby aircraft. A possibility is determined that the aircraft, traveling along the intended path, will be less than the distance from any of the terrain, weather events, and nearby aircraft. A pilot is advised if the possibility is above a predetermined threshold.

The invention further provides a system for maintaining a required separation distance between an aircraft and potential hazards. The system includes a processor and a source for information on the flight path of the aircraft. A plurality of hazard information sources provide information on potential hazards to the aircraft. Each of the hazard information sources provides an input to the processor. A database of aircraft performance characteristics is accessible by the processor. A source of required separation distances for each of the potential hazards is accessible by the processor. A plurality of sensors provide inputs to the processor relative to the operating state of the aircraft. The processor determines a possibility that the aircraft, traveling along the flight path, will violate any of the required separation distances, and whether the aircraft can maneuver to maintain the required separation distances. A visual notification apparatus is configured to display an advisory of the possibility of a violation of any of the required separation distances.

BRIEF DESCRIPTION OF THE DRAWINGS

FIG. 3 is a schematic diagram showing an aircraft in a terminal environment.

FIG. 4 is a schematic side elevational view of potential obstacles from a point of view of a pilot of an aircraft.

FIG. 5 is a display of a pilot advisory according to the invention.

DETAILED DESCRIPTION OF THE DRAWINGS

Figure 1:
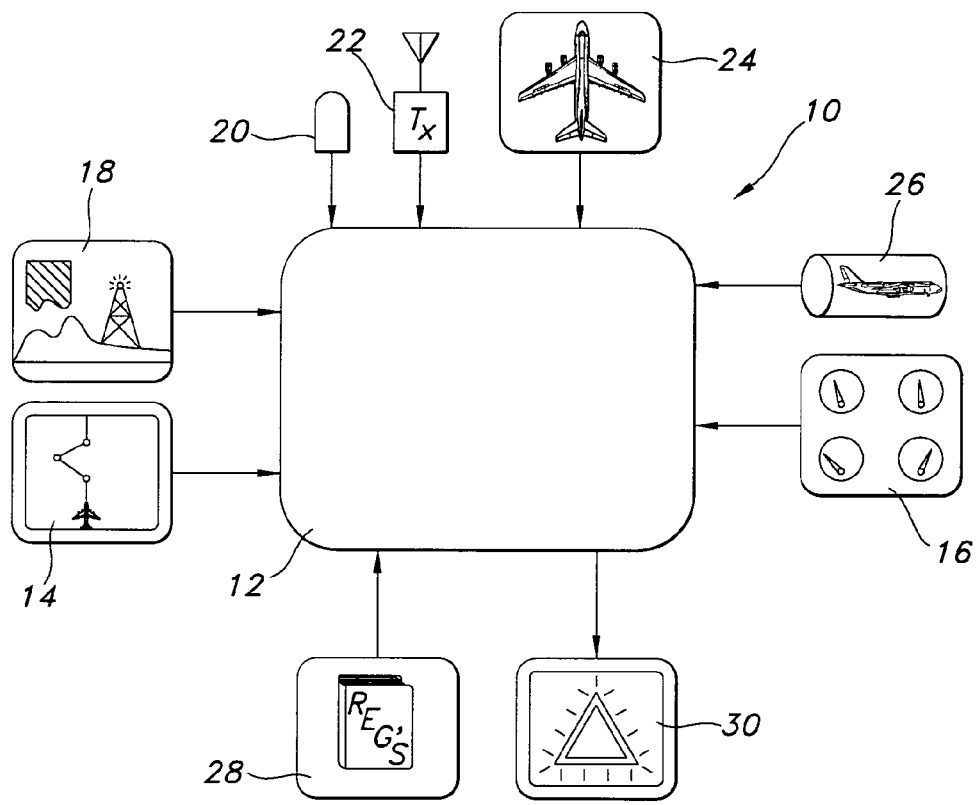
FIG. 1 is a schematic diagram of an avionics system according to the invention.

A system 10 for providing separation assurance for an aircraft is shown in FIG. 1. System 10 includes a processor 12 that may form part of a flight management system of an aircraft. To determine whether the aircraft may be within a predetermined distance from potential hazards, the processor requires inputs from a plurality of information sources. For example, an input from an avionics flight management system 14 provides processor 12 information regarding the anticipated flight plan of the aircraft. A first group of sensors 16 provide information to help determine the current state of the aircraft. First group of sensors 16 may provide information on the following: current attitude and attitude rate, current altitude and altitude rate (or vertical speed), current heading and heading rate, current speed, and similar parameters. Sensors for this type of data may be part of an air data computer, an inertial reference system, an attitude heading reference system, or the like. First group of sensors may also provide information on engine status, which may include the following: engine pressure ratio (EPR), revolutions per minute (typically indicated as N1 and/or N2 which are percentages or fractions of maximum RPMs) engine temperature, and other known parameters expressing the state of the engine. Such parameters are available through a wide variety of sensors depending on the type of aircraft. For example, on most modern passenger jets the data would come from an electronic engine controller, a full-authority digital engine controller, or the like.

The processor receives an input from a first memory 18, which provides information relating to potential nearby hazards. Such information may comprise one or more databases that describe digital terrain elevation, restricted airspace, or known flight obstacles. One or more radar antennas 20 are configured to provide weather radar, millimeter-wave radar, forward looking infrared, or other types of radar information that may detect potential flight hazards. Processor 12 also receives inputs from one or more communications channels (shown symbolically by a transceiver 22) which are configured to receive information regarding projected or intended flight plans of nearby aircraft. Projected flight plans may be extrapolated from (a) position, track, and velocity data of the nearby aircraft as provided by Automatic Dependent Surveillance-Broadcast (ADS-B) systems or similar systems, or (b) a history of position reports from a TCAS unit or an equivalent system. The communications channels may also provide uplinked weather data to the processor.

The processor further receives inputs from a second group of sensors, shown collectively at 24, that provide information relating to the current configuration of the aircraft. For example, second group of sensors 24 may provide information relating to the following: flap position, slat position, landing gear position, throttle position, Engine Out status for all engines, gross vehicle weight (as derived from fuel available), and so forth. The processor also receives inputs from a second memory 26 in which performance characteristics of the aircraft are stored. Examples of relevant aircraft performance characteristics include the aircraft's range, maximum altitude, maximum climb rate, and other similar parameters that define the maneuverability of the aircraft. Lastly, the processor accepts inputs from a third memory 28 in which is stored the required distance, or separation, that the aircraft must maintain from hazards the aircraft may encounter. The required distance may vary depending on the type of hazard, the speed at which the aircraft is traveling, and on whether the aircraft is taxiing, landing, taking off, or is in flight. The required distance is typically mandated by local or federal safety regulations duly issued by a relevant authority.

Processor 12 uses the information from first group of sensors 16 to determine the current state of the aircraft. Processor 12 also uses the inputs from flight management system 14 to determine the anticipated path of the aircraft. Alternately, the processor may determine the anticipated path or trajectory of the aircraft by analyzing the current state of the aircraft and the aircraft's maneuvering capabilities. The processor analyzes information obtained from first memory 18, radar 20, and transceivers 22 to determine whether any hazards would interfere with the anticipated path of the aircraft. Some of these hazards are shown schematically in FIG. 2, which is patterned after an output of a typical aircraft flight display 40.

For example, a storm cell 42 may be detected using radar 20 and/or uplinked weather data using transceiver 22. First memory 18 may provide information relevant to terrain 44 that is at or near the altitude of the aircraft. First memory 18 may also provide coordinates of restricted airspace 46 and other obstacles such as a radio tower 48. The position and intended paths of other aircraft 50a, 50b may be calculated using signals received by transceiver 22. Similar types of obstacles may be seen in a pilot's view of a take-off or landing scene 52 as shown in FIG. 3. FIG. 4 is a top plan view of a scene at an airport terminal 60, with the pilot's aircraft shown at 62. Nearby aircraft 50d, 50e and 50f are depicted on nearby taxiways 64, 66 and runways 68.

When potential obstacles have been identified, processor 12 consults third memory 28 to determine the distance the aircraft is required to maintain from each obstacle. For example, the aircraft may be required to maintain a distance of twenty miles from storm cell 42 and its path or probable location in the future, said distance being graphically expressed by boundary 42a in FIG. 2. On the other hand, the aircraft may only be required to maintain a distance of two miles (graphically expressed by boundary 48a) from radio tower 48. Required separation distances are determined for each identified hazard within a preset distance from the aircraft or from the intended path of the aircraft. The processor then determines the ability of the aircraft to maintain the required separation distances from the nearby hazards. This is accomplished by (1) analyzing information from the first group of sensors 16 and the second group of sensors 24 to determine the current state of the aircraft and the configuration of the aircraft, and (2) extracting from second memory 26 the performance characteristics of the aircraft. For example, an aircraft having a maximum flight ceiling of 30,000 feet cannot fly over a storm cell that extends to an altitude of 40,000 feet. Such an aircraft could be expected to maneuver around the storm cell instead of flying over it.

Figure 2:
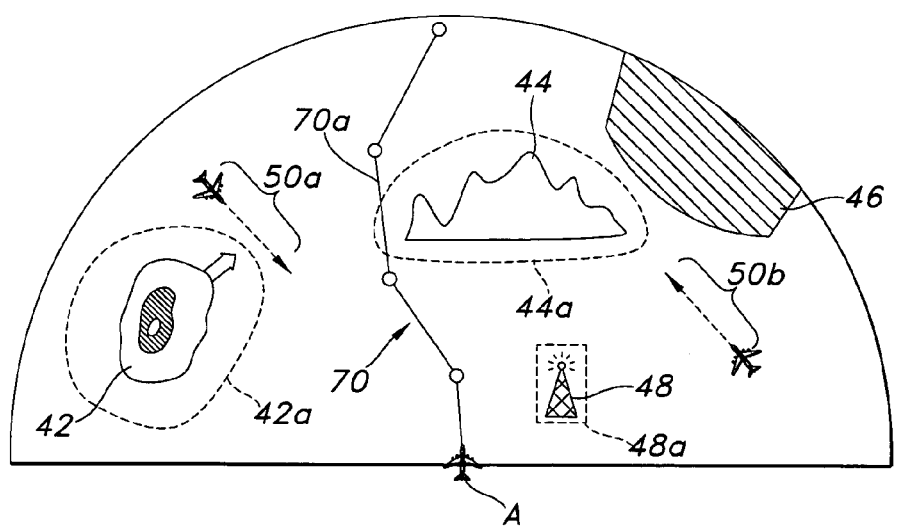
FIG. 2 is a schematic diagram of an avionics output according to the invention.

If there is sufficient possibility that the aircraft may not be able to maintain the required separation distance from one of the nearby hazards as the aircraft travels along a predicted path, the pilot is visually and/or aurally notified or advised of such a possibility. In a preferred embodiment, processor 12 provides a notice to a flight display 30 onboard the aircraft. As shown in FIG. 5, such a notice or pilot advisory may be text-based and may include the type of nearby hazard, the location of the hazard, and the estimated time before the aircraft encounters the hazard. The pilot advisory may also display recommended evasive actions the aircraft might take to avoid the hazard. Additionally or alternatively, the pilot advisory may be graphically communicated to the pilot, where as shown in FIG. 2 a separation boundary 44a of terrain hazard 44 conflicts with a flight plan 70 of an aircraft A. To graphically highlight the potential hazard to the pilot of the aircraft, processor 12 may be programmed to display terrain hazard 44 and/or separation boundary 44a in a contrasting color, or may cause the terrain hazard or its separation boundary to intermittently flash. The affected leg or legs 70a of flight plan 70 may also be displayed in a contrasting color, or may be programmed to intermittently flash.

System 10 therefore provides a pre-emptive advisory, to the flight crew if a separation violation is possible or likely. In contrast to known hazard warning systems, the advisory of the invention is provided minutes before a possible violation. It should be noted that the notice or advisory provided to the aircraft pilot according to the invention does not imply that an accident is imminent, but does imply that the aircraft may violate the regulatory requirements for maintaining separation from potential hazards. Therefore system 10 does not generate cautions or warnings that require the immediate attention of the flight crew. If the aircraft continues on the current path and the separation violation actually occurs, it is expected that one of the existing warning systems (such as TCAS) would provide the appropriate caution or warning to the flight crew. However, it is expected that by being apprised by system 10 of potential separation violations much earlier than is possible using the existing warning systems, a flight crew will have sufficient time to avoid potential hazards, and warnings from the existing warning systems (TCAS, GPWS, WXR) will therefore be significantly reduced.

Figure 6:
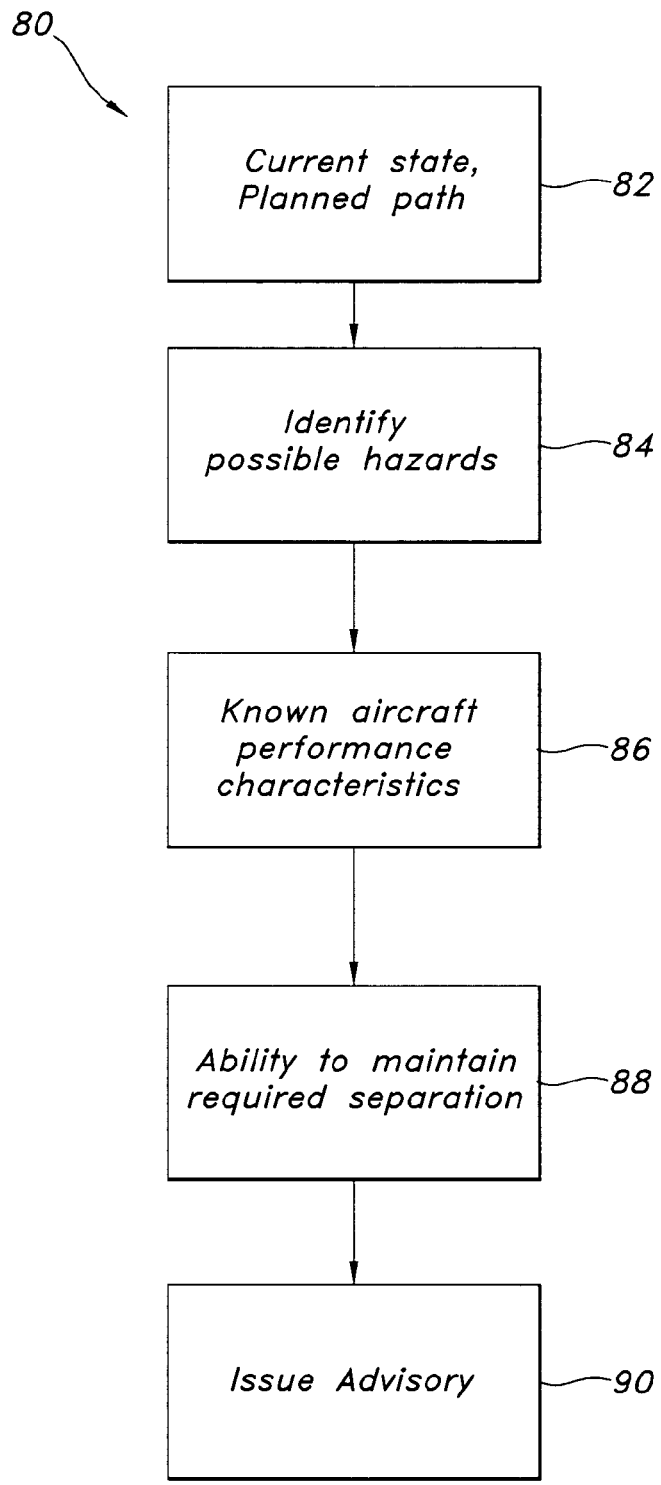
FIG. 6 is a flowchart of a method of the invention.

FIG. 6 is a flowchart summarily showing a method 80 of the present invention, which provides assurance that an aircraft will satisfy predetermined or regulatory requirements for separation from known obstacles or hazards. According to the method, in step 82 a current state of the aircraft as well as its planned path is determined. In step 84 inputs from a plurality of sources are accepted to identify possible hazards or events that may interfere or otherwise conflict with the aircraft's planned path. In step 86, known aircraft performance characteristics are accessed. In step 88 the method determines the ability of the aircraft to avoid the possible hazards to the extent necessary to satisfy predetermined separation requirements. In step 90 the method issues an advisory if there is sufficient likelihood of violating the predetermined separation requirements.

An advantage of the invention is that a flight crew is provided with a system that integrates information relating to multiple types of potential hazards.

Another advantage of the invention is that a flight crew is notified of possible hazards along a predicted or programmed flight path, and is given ample time to avoid or otherwise deal with the hazards.

Still another advantage of the invention is that by varying the database containing aircraft performance characteristics, multiple aircraft types may use the invention.

Yet another advantage is that data from existing technologies, such as TCAS, FLIR, WXR, and others, may be incorporated in virtually any combination. This flexibility in data inputs ensures the invention can robustly perform and incorporate future hazard avoidance technologies therein.

While the invention has been disclosed in its preferred form, the specific embodiments thereof as disclosed and illustrated herein are not to be considered in a limiting sense as numerous variations are possible. The subject matter of the invention includes all novel and non-obvious combinations and subcombinations of the various elements, features, functions and/or properties disclosed herein. No single feature, function, element or property of the disclosed embodiments is essential to all of the disclosed inventions. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the invention of the present disclosure.

What is claimed is:

1. A method of assuring separation between an aircraft and potential flight hazards, comprising:

predicting an intended path of the aircraft; accessing information relative to terrain proximal the aircraft; receiving inputs representative of weather events proximal the aircraft; receiving inputs representative of locations of nearby aircraft; accessing separation information that provides a distance by which the aircraft must be separated from any of the terrain, weather events, and nearby aircraft;

determining a possibility that the aircraft, traveling along the intended path, will be less than the distance from any of the terrain, weather events, and nearby aircraft; and advising a pilot of the aircraft if the possibility is above a predetermined threshold accessing information relative to areas of restricted airspace proximal the aircraft;

accessing separation information that provides a distance by which the aircraft must be separated from the restricted airspace;

determining a possibility that the aircraft, traveling along the intended path, will be less than the distance from the restricted airspace; and advising a pilot of the aircraft if the possibility is above a predetermined threshold.

* * * * *